Patented Oct. 19, 1948

2,451,564

UNITED STATES PATENT OFFICE 2,451,564

TREATMENT OF HYDROCARBONS WITH ACTIVATED MAGNESIUM SILICATES

William A. La Lande, Jr., Upper Darby, Pa., assignor to Attapulgus Clay Company, Philadelphia, Pa., a corporation of Delaware No Drawing. Original application March 14, 1942, Serial No. 434,776. Divided and this application August 13, 1946, Serial No. 690,332

5 Claims. (Cl. 196—52)

1

The present invention relates to the preparation of adsorbent compositions, and more particularly to the production of magnesium silicates or mixtures containing magnesium silicates suitable for use as decolorizing adsorbents and catalysts.

This application is a division of my copending application Serial Number 434,776, filed March 14, 1942, now U. S. Patent No. 2,434,418, dated January 13, 1948, entitled "Preparation and use of magnesium silicate adsorbents."

An object of this invention is the preparation of adsorbent compositions by reacting in aqueous solution an alkali metal silicate and a water-soluble salt of magnesium, in the presence of a compound yielding ammonium ions ($NH_4+$) in aqueous solution.

A further object of this invention is the activation of magnesium silicate adsorbents subsequent to their formation, by treatment with a compound yielding ammonium ions ($NH_4+$) in aqueous solution.

It has been proposed heretofore to produce magnesium silicates by reacting an alkali metal silicate with a water-soluble salt of magnesium, or by reacting an alkali metal silicate with a water-soluble calcium salt and transposing the resulting calcium silicate to magnesium silicate by treatment with a water-soluble magnesium salt. A further method comprises the treatment of naturally-occurring calcium silicates with a water-soluble salt of magnesium. A still further method involves the treatment of magnesium basic carbonate with silica, water, and alkali at elevated temperature and pressure.

However, I have discovered that by carrying out the processes aforementioned at an elevated temperature in the presence of a compound yielding $NH_4+$ ions in aqueous solution, or by treating the products of said processes at an elevated temperature with a compound yielding $NH_4+$ ions in aqueous solution, I am able to produce improved adsorbents suitable for use as decolorizing agents or catalysts. Such silicates differ from those formed in the absence of compounds yielding $NH_4+$ ions, in that they possess a higher decolorizing or bleaching power for oils, a lower retentivity, and permit higher filtration rates when employed in the decolorization of oils, wax, and the like. Furthermore, the adsorbents prepared in accordance with my invention are more efficient catalysts for the conversion of hydrocarbons than the adsorbents produced by the prior art methods.

In accordance with one aspect of my invention, an alkali metal silicate is dispersed in sufficient water to dissolve the compound, and to this solution is added a second solution containing a water-soluble ammonium salt and a water-soluble salt of magnesium. While chemically equivalent amounts of alkali metal silicate and water-soluble magnesium salt may be employed, I prefer to have present in the reaction mixture, an excess of magnesium salt over that required for complete reaction with the alkali metal silicate. The quantity of ammonium salt may vary, and good results have been obtained using amounts chemically equivalent to the water-soluble magnesium salt. The mixture is then heated, preferably at its boiling point, for a period of time sufficient to complete the reaction, whereby there is produced a water-insoluble product comprising magnesium silicate. Silicates corresponding to the approximate formulae $MgO.SiO_2$, $MgO.2SiO_2$, $MgO.3SiO_2$ and $2MgO.3SiO_2$ may be produced. The insoluble product is then separated from the reaction mixture by suitable means, for example, by decantation, filtering or centrifuging, and the product is then washed free of soluble salts, dried to a suitable volatile matter content, and reduced to particles of desired size. As alternative procedures, the alkali metal silicate may be reacted with a water-soluble magnesium salt to form a water-insoluble magnesium silicate, and the latter may then be separated and treated at elevated temperature with a compound capable of yielding ammonium ions in aqueous solution. Or, a magnesium silicate may be prepared by reacting an alkali metal silicate with a water-soluble calcium salt, and the resulting insoluble calcium silicate then transposed into a magnesium silicate by treatment with a water-soluble magnesium salt. Or, a magnesium basic carbonate may be treated with silica, water, and alkali at elevated temperature and pressure to produce a magnesium silicate. During the formation of the silicates, a compound capable of yielding ammonium ions may advantageously be present, or the silicates, after formation, may be treated at elevated temperature with a water-soluble ammonium salt.

And, finally, a naturally occurring calcium silicate may be treated with a water-soluble magnesium salt, at an elevated temperature, in the presence of a compound capable of yielding ammonium ions. In general, any magnesium silicate adsorbent, either during its preparation or subsequent thereto, is improved by the presence of, or the treatment with, a compound yielding ammonium ions in aqueous solution, at temperatures above about 150° F. Treatment of the magnesium silicate with solutions of ammonium compounds at ordinary temperatures produces no improvement.

In carrying out my process, I may employ commercially available alkali metal silicates having a ratio of $Na_2O:SiO_2$ or $K_2O:SiO_2$ of 1:1 to 1:4. The silicates may be used in aqueous solution of desired concentration, and the ratio of $Na_2O:SiO_2$ or $K_2O:SiO_2$ may be adjusted by the addition of suitable quantities of NaOH or KOH. Commercial sodium silicate having a ratio of $Na_2O:SiO_2$ of 1:3.22, and a Baumé gravity of 41°, has been found satisfactory for use. Alkali metal silicates produced by the treatment of silica or other highly siliceous minerals with alkali metal hydroxides, oxides, peroxides, or carbonates, may also be used. For example, materials containing alkali metal silicates produced by fusing fuller's earth, bentonite, or other naturally occurring silicates, with an alkali metal carbonate, or by treating such naturally occurring silicates with an alkali metal hydroxide solution at elevated temperatures, may be satisfactorily employed. As compounds capable of furnishing ammonium ions ($NH_4+$) in aqueous solution, I may utilize for example, ammonium chloride, ammonium sulfate, or ammonium nitrate. Insofar as the water-soluble magnesium salts are concerned, I prefer to use the chloride or the sulfate, although other soluble magnesium salts may be employed. Magnesium chloride solutions, particularly magnesium chloride brines from salt wells, are available in large quantities and at relatively low cost, and may be satisfactorily employed in the practice of my invention. While satisfactory results may be obtained using chemically equivalent amounts of an ammonium compound and of a soluble magnesium salt, based upon the alkali content of the alkali metal silicate employed, it is not necessary to do so in all cases, as the completion of the reaction may be favored by having present an excess of the magnesium salt or the ammonium salt. The concentrations of the solutions employed may vary over a wide range, for example, from 1 per cent up to saturation at the boiling point of the solution or mixture of solutions. The temperature at which the reaction is carried out is preferably that which is necessary to maintain the solution or mixture of the reactants at its boiling point, however, higher or lower temperatures may be utilized. In general, temperatures of from about 150° F. to about 400° F. are suitable, sufficient pressure being maintained upon the reaction mixture to prevent substantial loss of water therefrom. The reaction time will vary considerably, depending upon the quantities and concentrations of the reactants, the degree of agitation of the reaction mixture, and the temperature at which the reaction is carried out. In some cases the formation of the magnesium silicate may be completed in a few hours, whereas in other cases the reaction may require 10 to 15 hours, or more. The magnesium silicate, upon completion of the reaction, may be freed of soluble salts by washing with water, and then dried to a suitable volatile matter content (water content) prior to reduction of the silicate to desired particle size. Depending upon the use to which the metal silicate is to be put, the particle size and volatile matter content will vary. The volatile content may range from 10 per cent to about 30 per cent by weight, and is preferably of the order of 15 per cent–20 per cent by weight. The particle size or mesh of the silicate may be of the order of 20–60 mesh for the percolation decolorization of oils, or 4–60 mesh for the catalytic treatment of oils or other compounds, or finer than 100 mesh for the contact decolorization of oils or the catalytic conversion of hydrocarbons.

My invention may be further illustrated by the following examples, which, however, are not to be construed as limiting the scope thereof:

1. 204 parts by weight of $MgCl_2.6H_2O$ and 107 parts by weight of $NH_4Cl$ were dissolved in 1000 parts by weight of water, and the resulting solution was introduced into a reaction vessel provided with a stirrer and a reflux condenser. A second solution was made up consisting of 676 parts by weight of sodium silicate ($1Na_2O: 3.22SiO_2$, 41° Bé.) and 475 parts by weight of water, and this solution was added to the solution first mentioned, with vigorous stirring. The mixture was then boiled for 2 hours at 214° F., the reflux condenser serving to prevent loss of water. As a result of the reaction between the sodium silicate and the magnesium chloride, in the presence of the ammonium chloride, there was produced a white, insoluble precipitate comprising magnesium silicate, which was filtered from the solution, washed free of soluble salts with water, and air dried. The adsorbent product so produced had a volatile content (water) of 26.2 per cent by weight, determined by heating a sample of it at 1800° F. for 20 minutes. The volume weight of the product (26.2 per cent volatile content) was 31.4 pounds per cubic foot. The decolorizing efficiency of this material was determined by contacting it with a hydrocarbon lubricating oil stock having a Saybolt universal viscosity of 150 seconds at 210° F., an A. P. I. gravity of 25.5°, and an O. D. color of 821. Upon completion of the contacting step, the adsorbent was filtered from the oil and the color of the oil was measured. The results obtained with different quantities of the adsorbent at different temperatures are as follows:

| | O. D. color |
|---|---|
| Lubricating oil stock | 821 |
| Contacted with 10% of adsorbent at 500° F. for 20 minutes | 272 |
| Contacted with 15% of adsorbent at 500° F. for 20 minutes | 223 |
| Contacted with 15% of adsorbent at 300° F. for 20 minutes | 245 |

2. A solution consisting of 1220 parts by weight of sodium silicate ($1Na_2O:3.22SiO_2$, 41° Bé.) and 700 parts by weight of water was added, with vigorous agitation, to a second solution consisting of 356 parts by weight of $MgCl_2.6H_2O$, 562 parts by weight of $NH_4Cl$, and 1020 parts by weight of water. The mixture was boiled for 2 hours at 220° F., under a reflux condenser, until the reaction between the sodium silicate and magnesium chloride was substantially complete. The resulting water-insoluble precipitate comprising magnesium silicate was filtered from the solution, washed free of soluble salts with water, and air dried. The adsorbent so produced had a volatile content (water) of 20.9 per cent by weight, and a volume weight of 15.3 pounds per cubic foot.

The procedure above set forth was repeated, with the exception that the NH₄Cl was omitted. The resulting product, formed in the absence of NH₄Cl, had a volatile content (water) of 24.6 per cent by weight, and a volume weight of 27.7 pounds per cubic foot.

The decolorizing efficiencies of the two products prepared as above described were determined by contacting the adsorbents with the same lubricating oil stock as employed in Example 1. The results obtained with different quantities of the adsorbents at different temperatures are as follows:

Adsorbent prepared in the presence of NH₄Cl:     O. D. color
    Lubricating oil stock ———————————— 821
    Contacted with 10% of adsorbent at 500°
      F. for 20 minutes ———————————— 272
    Contacted with 15% of adsorbent at 300°
      F. for 20 minutes ———————————— 208

Adsorbent prepared in the absence of NH₄Cl:
    Contacted with 10% of adsorbent at 500°
      F. for 20 minutes ———————————— 311
    contacted with 15% of adsorbent at 300°
      F. for 20 minutes ———————————— 344

3. 155 parts by weight of Polkville bentonite (volatile content 17.2 per cent) was thoroughly admixed with 338 parts by weight of soda ash ($Na_2CO_3$ containing 10 per cent by weight of water). The mixture was dried at 220° F. to remove water, and thereafter was fused at a temperature of about 1800° F. for 3 hours. The fused mass was cooled, and then ground and screened to pass 200 mesh.

200 parts by weight of the finely divided material from the fusion was mixed with 500 parts by weight of water to form a slurry. To this slurry was added a solution consisting of 268 parts by weight of $MgCl_2.6H_2O$, 142 parts by weight of NH₄Cl, and 400 parts by weight of water. The mixture was then boiled, under a reflux condenser, for 10 hours, with vigorous agitation. Upon completion of the heating period, the finely divided treated material comprising a mixture of water-insoluble silicates, including magnesium silicate, was filtered from the solution, thoroughly washed with water to remove soluble salts, and then air dried. The silicate mixture so produced had a volatile content (water) of 35.2 per cent by weight, and a volume weight of 21.5 pounds per cubic foot. The decolorizing efficiency of the silicate mixture was determined by contacting with a lubricating oil stock having an O. D. color 850. The results obtained with different quantities of the silicate mixture are as follows:

O. D. color
Lubricating oil stock ———————————— 850
Contacted with 10% of silicate at 500° F. for
  20 minutes ———————————————— 382
Contacted with 15% of silicate at 500° F. for
  20 minutes ———————————————— 274

4. 375 parts by weight of fuller's earth obtained from Attapulgus, Georgia, having a volatile content of 20.0 per cent by weight, was admixed with 777 parts by weight of soda ash ($Na_2CO_3$ containing 10 per cent by weight of water). The mixture was dried at 220° F. to remove water, and thereafter was fused at a temperature of about 1700° F. for 3 hours. The fused mass was cooled, and then ground and screened to pass 200 mesh.

300 parts by weight of the finely divided material from the fusion was mixed with 500 parts by weight of water to form a slurry. To this slurry was added a solution consisting of 533 parts by weight of $MgCl_2.6H_2O$, 283 parts by weight of NH₄Cl, and 2000 parts by weight of water. The mixture was then boiled, under a reflux condenser, for 10 hours, with vigorous agitation. Upon completion of the heating period, the finely divided treated material comprising a mixture of water-insoluble silicates including magnesium silicate, was filtered from the solution, thoroughly washed with water to remove soluble salts, and then air dried. The silicate mixture so produced had a volatile content (water) of 35.0 per cent by weight, and a volume weight of 38.3 pounds per cubic foot.

The procedure above set forth was repeated, with the exception that the NH₄Cl was omitted. The resulting silicate mixture had a volatile content (water) of 38.8 per cent, and a volume weight of 30.2 pounds per cubic foot.

The decolorizing efficiencies of the two silicate mixtures prepared as above described were determined by contacting the silicates with a lubricating oil stock having an O. D. color of 821. The results obtained with different quantities of the silicate mixtures at different temperatures are as follows:

Silicates prepared in the presence of NH₄Cl:     O. D. color
    Lubricating oil stock ———————————— 821
    Contacted with 10% of silicate at 500°
      F. for 20 minutes ———————————— 394
    Contacted with 15% of silicate at 500°
      F. for 20 minutes ———————————— 282
    Contacted with 10% of silicate at 300°
      F. for 20 minutes ———————————— 454

Silicates prepared in the absence of NH₄Cl:
    Contacted with 10% of silicate at 500°
      F. for 20 minutes ———————————— 559
    Contacted with 15% of silicate at 500°
      F. for 20 minutes ———————————— 481
    Contacted with 15% of silicate at 300°
      F. for 20 minutes ———————————— 613

5. 204 parts by weight of $MgCl_2.6H_2O$ was dissolved in 1000 parts by weight of water, and the resulting solution was introduced into a reaction vessel provided with a stirrer and a reflux condenser. A second solution was made up consisting of 676 parts by weight of sodium silicate ($1Na_2O:3.22SiO_2$, 41° Bé.) and 475 parts by weight of water, and this solution was added to the solution first mentioned, with vigorous stirring. The mixture was then boiled for 2 hours at 214° F., the reflux condenser serving to prevent loss of water. As a result of the reaction between the sodium silicate and the magnesium chloride, there was produced a white, insoluble precipitate comprising magnesium silicate, which was filtered from the solution. 220 parts by weight of this product was dispersed in 1000 parts by weight of water, and a solution of 160 parts by weight of $NH_4NO_3$ in 1000 parts by weight of water was added. The mixture was boiled for 2 hours with constant agitation, and the insoluble silicate was filtered from the solution, thoroughly washed with water, and dried. The magnesium silicate so produced had a volatile content (water) of 19.5 per cent by weight, determined by heating a sample of the silicate at 1800° F. for 20 minutes. The volume weight of the silicate (19.5 per cent volatile content) was 31.3 pounds per cubic foot. The decolorizing efficiency of the silicate was determined by contacting the silicate with a hydrocarbon lubricating oil stock having a Saybolt universal viscosity of 150 seconds at 210° F., an A. P. I. gravity of 25.5°, and an O. D. color of 821. Upon completion of the contacting step, the silicate was filtered from the oil and the color of the oil was measured. The results obtained with the silicate at different temperatures are as follows:

|  | O. D. color |
|---|---|
| Lubricting oil stock | 821 |
| Contacted with 15% of silicate at 500° F. for 20 minutes | 210 |
| Contacted with 15% of silicate at 300° F. for 20 minutes | 259 |

The magnesium silicate initially prepared, without activation with $NH_4NO_3$, gave the following results:

|  | O. D. color |
|---|---|
| Lubricating oil stock | 821 |
| Contacted with 15% of silicate at 500° F. for 20 minutes | 285 |
| Contacted with 15% of silicate at 300° F. for 20 minutes | 335 |

In order to determine the decolorizing efficiency for vegetable oil of the silicate activated with $NH_4NO_3$ and of the silicate not activated with $NH_4NO_3$, a soda-cut linseed oil was contacted with each of the silicates at 210° F. for 15 minutes. The linseed oil was decolorized to 5.8 red (Lovibond, 6" column, 35 yellow), the yield from the silicate not activated with $NH_4NO_3$ being arbitrarily designated at 100 per cent. Upon this basis, the yield of oil from the silicate activated with $NH_4NO_3$ was found to be 225 per cent.

6. 220 parts by weight of a commercial magnesium silicate produced in accordance with the disclosure of U. S. Patent 2,163,525 to Caldwell, was dispersed in 1000 parts by weight of water, and a solution of 160 parts by weight of $NH_4NO_3$ in 1000 parts by weight of water was added. The mixture was boiled for 2 hours with constant agitation, and the insoluble silicate was filtered from the solution, thoroughly washed with water, and dried. The activated magnesium silicate had a volatile content (water) or 21.4 per cent by weight.

The decoloring efficiency for vegetable oil of the commercial magnesium silicate aforesaid activated with $NH_4NO_3$, and the magesium silicate not activated with $NH_4NO_3$ was determined by contacting these materials with soda-cut linseed oil at 210° F. for 15 minutes. The linseed oil was decolorized to 5.8 red (Lovibond, 6" column, 35 yellow), the yield from the magnesium silicate not activated with $NH_4NO_3$ being arbitrarily designated as 100 per cent. Upon this basis, the yield of oil from the magnesium silicate activated with $NH_4NO_3$ was found to be 385 per cent.

From the above examples, it will be apparent that, in accordance with the present invention, highly efficient decolorizing adsorbents may be prepared, and that such adsorbents are superior to those produced in the absence of a compound yielding $NH_4+$ ions in aqueous solution.

While, in the preparation of the adsorbents above described, I prefer to effect reaction of the components in aqueous solution by simply boiling the solution under a reflux condenser, I may dispense with the condenser and add water when necessary, or I may carry out the reaction under superatmospheric pressure, for example, in a reaction vessel at pressures up to several hundred pounds per square inch. The quantities and concentrations of the reaction components, as well as the reaction temperatures, may also be varied considerably from those shown in the examples.

The adsorbent compositions of the present invention may be employed not only as decolorizing agents for hydrocarbon oils, vegetable oils, waxes, and the like, but also may be utilized as catalysts in the cracking or conversion of hydrocarbon oils and gases into motor fuel; in the reforming of gasoline to increase the anti-knock value thereof; in the thermal treatment of oil distillates such as gasoline, furnace oil, and the like for the removal of gum-forming compounds and sulfur compounds; in the hydrogenation, dehydrogenation, or cyclization of hydrocarbon oils and gases; or as a supporter or promoter for other catalysts such as the metals, metal oxides, metal sulfides, and the like. In the cracking or conversion of hydrocarbon oils, the catalysts may be employed in the form of granules or pellets for fixed bed or moving bed operations, or in the form of a finely divided powder for the "fluid" catalyst processes.

The cracking of hydrocarbon oils such as petroleum gas oil or higher boiling oil in the presence of the silicate catalyst of the present invention may be carried out at temperatures between 700° F. and 1150° F., and preferably between 850° F. and 1050° F., under atmospheric or superatmospheric pressure, using flow rates, for example, of from 1 to 5 volumes of oil per volume of catalyst per hour.

The reforming of gasoline stocks or heavy naphthas in the presence of the silicate catalysts to increase the anti-knock value of the gasoline or naphtha may be performed at temperatures of the order of 900° F. to 1025° F. under atmospheric or higher pressure.

The conversion of hydrocarbon gases into motor fuel by cracking and polymerization in the presence of the silicate catalysts may be accomplished at temperatures between 950° F. and 1150° F., and at pressures up to about 3500 lbs. per square inch, while the dehydrogenation of such gases to produce olefin hydrocarbons may be effected at similar temperatures but preferably at atmospheric or slightly superatmospheric pressures.

The removal of gum-forming and sulfur compounds from hydrocarbon distillates such as gasoline, kerosine, and furnace oil may be carried out in the presense of the silicate catalyst at temperatures of the order of 550° F. to 750° F., preferably at substantially atmospheric pressure, although pressures up to about 100 pounds per square inch may be employed.

The following examples will serve to illustrate the use of the silicate adsorbents of the present invention as catalysts in the conversion of hydrocarbon oil into motor fuel.

7. A water-insoluble magnesium silicate was prepared in accordance with the general procedure set forth in Example 1, such silicate having a volatile content of 21.6 per cent by weight and a particle size finer than 200 mesh. The silicate was compressed into small pellets in a conventional pelleting machine, and the pellets were introduced into an externally heated reaction vessel. A petroleum gas oil, having a distillation range of 282° F. to 692° F. and an A. P. I. gravity of 33.1°, was vaporized and passed at substantially atmospheric pressure through the catalyst chamber containing the magnesium silicate pellets. The reaction temperature was maintained at 891° F., and the flow rate at 1 volume of gas oil per volume of catalyst per hour. The products of the cracking operation were collected and separated by fractionation, and there was obtained 31.4 per cent by volume of 400° F. end point gasoline, and 6.2 per cent by weight of uncondensed gas. The cracking reaction was repeated, using magnesium silicate produced according to the general procedure of Example 1, with the exception that the $NH_4Cl$ was omitted from the method of preparation, and there was obtained 25.0 per cent by volume of 400° F. end point gasoline, and 4.5 per cent by weight of uncondensed gas.

8. Finely divided magnesium silicate prepared in accordance with Example 5, supra, in which $NH_4NO_3$ was employed in the activating treatment, was pelleted in a conventional pelleting machine. The catalyst pellets were introduced into an externally heated reaction vessel, and a petroleum gas oil having a distillation range of 282° F. to 692° F. and an A. P. I. gravity of 33.1° was vaporized and passed at substantially atmospheric pressure through the reaction vessel containing the catalyst pellets. The reaction temperature was maintained at 888° F., and the flow rate at 1 volume of gas oil per volume of catalyst per hour. The products of the cracking reaction were collected and separated by fractionation, and there was obtained 31.4 per cent by volume of 400° F. end point gasoline and 5.9 per cent by weight of uncondensed gas, based upon the oil initially charged. The cracking reaction was repeated, using magnesium silicate prepared in the manner set forth in Example 5, with the exception that the $NH_4NO_3$ treatment was omitted, and there was obtained 25.0 per cent by volume of 400° F. end point gasoline, and 4.5 per cent by weight of uncondensed gas.

9. Finely divided commercial magnesium silicate activated by treatment with $NH_4NO_3$ as described in Example 6, was pelleted in a conventional pelleting machine, and the catalyst pellets were introduced into an externally heated reaction vessel. A petroleum gas oil having a distillation range of 282° F. to 692° F. and an A. P. I. gravity of 33.1° was vaporized and passed at substantially atmospheric pressure through the vessel containing the catalyst pellets. The reaction temperature was maintained at 883° F., and the flow rate at 1.2 volumes of gas oil per volume of catalyst per hour. The products of the cracking reaction were collected and separated by fractionation and there was obtained 29.0 per cent by volume of 400° F. end point gasoline, and 8.0% by weight of uncondensed gas, based upon the oil initially charged. The cracking reaction was repeated, using magnesium silicate which had not been subjected to an activiting treatment with $NH_4NO_3$, and there was obtained 25.0 per cent by volume of 400° F. end point gasoline, and 4.0 per cent by weight of uncondensed gas.

10. 220 parts by weight of a commercial magnesium silicate corresponding to the formula $2MgO.3SiO_2$, having a volatile content of 25.6 per cent by weight and a volume weight of 42.4 lbs. per cubic foot, was dispersed in 3000 parts by weight of water, and a solution of 160 parts by weight of $NH_4NO_3$ in 1000 parts by weight of water was added. The mixture was boiled for 2 hours with constant agitation, and the insoluble silicate was filtered from the solution, thoroughly washed with water, and dried. The activated silicate had a volatile content (water) of 23.2 per cent by weight and a volume weight of 48.2 lbs. per cubic foot.

The finely divided silicate, activated by treatment with $NH_4NO_3$ as described above, was pelleted in a conventional pelleting machine, and the catalyst pellets were introduced into an externally heated reaction vessel. A petroleum gas oil having a distillation range of 282° F. to 692° F. and an A. P. I. gravity of 33.1° was vaporized and passed at substantially atmospheric pressure through the vessel containing the catalyst pellets. The reaction temperature was maintained at 890° F., and the flow rate at 1.2 volumes of gas oil per volume of catalyst per hour. The products of the cracking reaction were collected and separated by fractionation and there was obtained 32.6 per cent by volume of 400° F. end point gasoline, and 9.8% by weight of uncondensed gas, based upon the oil initially charged. The cracking reaction was repeated, using the initial silicate which had not been subjected to an activating treatment with $NH_4NO_3$, and there was obtained 16.5 per cent by volume of 400° F. end point gasoline, and 3.9 per cent by weight of uncondensed gas.

The adsorbent and catalyst compositions of the present invention may be regenerated or revivified after their decolorizing or catalytic activity has decreased through adsorption of carbonaceous materials during use, by treating such used adsorbents or catalysts with a solvent or solvent mixture capable of dissolving or displacing the undesirable carbonaceous materials. For example, the used adsorbents or catalyst may be washed with naphtha, alcohols, ketones, benzol, chlorinated hydrocarbon solvents, or mixtures thereof such as naphtha and acetone, in order to dissolve and remove adsorbed carbonaceous materials. Or, the used adsorbents or catalysts, with or without preliminary washing or steaming, may be regenerated by heating, preferably in the presence of air, or gases containing controlled amounts of oxygen, in order to remove carbonaceous impurities.

I claim:

1. A method of treating petroleum hydrocarbons, which comprises contacting said hydrocarbons, at a temperature within the range of from 700° F. to 1150° F., with a catalyst comprising a water-insoluble magnesium silicate activated by treatment with an ammonium compound in aqueous solution at a temperature between 150° F. and 400° F.

2. A method of treating petroleum hydrocarbons, which comprises contacting said hydrocarbons at a temperature within the range of from 700° F. to 1150° F., with a catalyst comprising a water-insoluble magnesium silicate formed by the reaction in aqueous solution of an alkali metal silicate and a water-soluble salt of magnesium, in the presence of a compound yielding $NH_4+$ ions in aqueous solution at a temperature between 150° F. and 400° F., the insoluble silicate thereafter being washed with water to remove soluble salts, and dried.

3. A method of treating petroleum hydrocarbons, which comprises contacting said hydrocarbons, at a temperature within the range of from 700° F. to 1150° F., with a catalyst comprising a water-insoluble magnesium silicate formed by the reaction in aqueous solution of sodium silicate and magnesium chloride, in the presence of ammonium chloride at a temperature between 150° F. and 400° F., the insoluble silicate thereafter being washed with water to remove soluble salts, and dried.

4. A method of converting petroleum hydrocarbons into motor fuel, which comprises contacting said hydrocarbons, at a temperature within the range of from 850° F. to 1050° F. with a catalyst comprising a water-insoluble magnesium silicate activated by treatment with an ammonium compound in aqueous solution at a temperature between 150° F. and 400° F.

5. A method of converting petroleum hydrocarbons into motor fuel, which comprises contacting said hydrocarbons, at a temperature within the range of from 850° F. to 1050° F., with a catalyst comprising a water-insoluble magnesium silicate formed by the reaction in aqueous solution of an alkali metal silicate and a water-soluble salt of magnesium, in the presence of a compound yielding NA4+ ions in aqueous solution at a temperature between 150° F. and 400° F., the insoluble silicate thereafter being washed with water to remove soluble salts, and dried.

WILLIAM A. LA LANDE, Jr.

REFERENCES CITED

The following references are of record in the file of this patent:

UNITED STATES PATENTS

| Number | Name | Date |
|---|---|---|
| 2,324,518 | Klein | July 20, 1943 |
| 2,337,684 | Scheineman | Dec. 28, 1943 |
| 2,355,388 | Michael et al. | Aug. 8, 1944 |
| 2,367,694 | Snuggs | Jan. 23, 1945 |
| 2,390,556 | Ruthruff | Dec. 11, 1945 |
| 2,399,261 | Thomas | Apr. 30, 1946 |
| 2,402,804 | Chichot | Jan. 25, 1946 |

FOREIGN PATENTS

| Number | Country | Date |
|---|---|---|
| 504,614 | Great Britain | Apr. 24, 1939 |